April 18, 1939.    W. L. HANSEN ET AL    2,155,266
SYNCHRONOUS MOTOR
Original Filed May 5, 1936
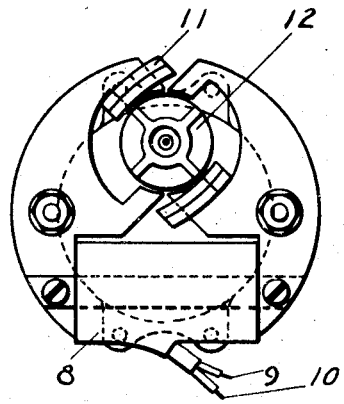
FIG 1
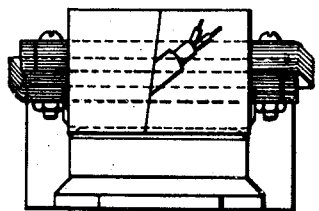
FIG 4
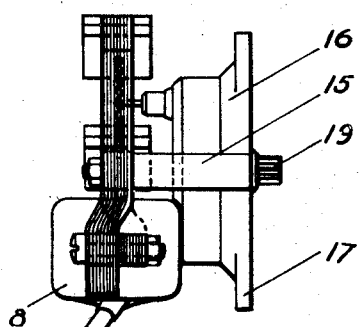
FIG 2
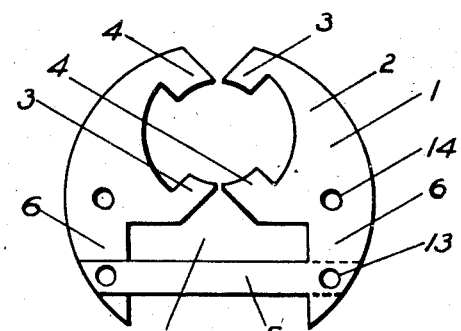
FIG 5
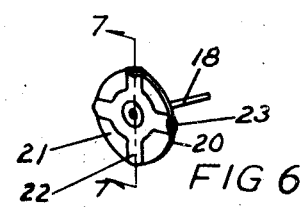
FIG 6
FIG 7
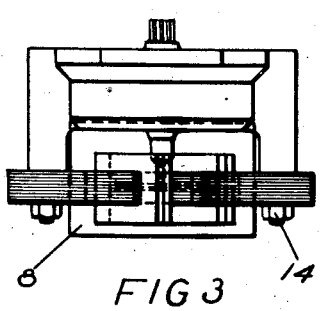
FIG 3
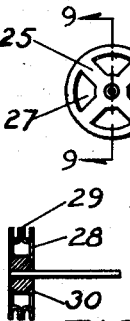
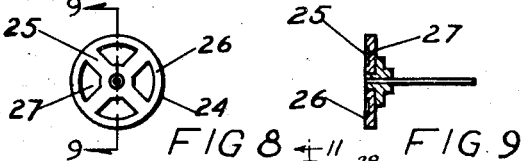
FIG 8    FIG 9
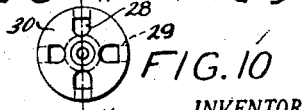
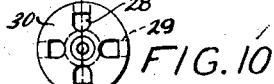
FIG 11
INVENTOR.
WILLIAM L. HANSEN
IRA N. HURST
BY
ATTORNEYS.

Patented Apr. 18, 1939

2,155,266

UNITED STATES PATENT OFFICE 2,155,266

SYNCHRONOUS MOTOR

William L. Hansen and Ira N. Hurst, Princeton, Ind., assignors to Hansen Mfg. Company, Inc., Princeton, Ind., a corporation of Indiana Original application May 5, 1936, Serial No. 78,002. Divided and this application April 12, 1937, Serial No. 136,503

2 Claims. (Cl. 172—120)

Our invention relates to synchronous motors and, in particular, to rotors for such motors.

One object of our invention is to provide a rotor of continuous disk form which has a plurality of synchronized poles in the disk such as four synchronizing poles, and by this construction assuring a self-starting motor.

It is a further object to provide a rotor having the same characteristics in which the poles are formed by punched sections having tongues punched from the metal and bent back until the ends of the tongues just reach the outer rim of the disk.

This application is a division of our application filed May 5, 1936, Serial No. 78,002.

Referring to the drawing, Figure 1 is a front elevation of the motor.

Figure 2 is a side elevation thereof showing the motor and gear box.

Figure 3 is a top plan thereof.

Figure 4 is a bottom plan.

Figure 5 is a detailed view with the field coils removed of field laminations with the shading plates removed from the poles of the shaded poles.

Figure 6 is a perspective of one of the rotors.

Figure 7 is a section on the line 7—7 of Figure 6.

Figure 8 is a front elevation of an alternative form of one-piece rotor having struck-up ribs and rim.

Figure 9 is a section on the line 9—9 of Figure 8.

Figure 10 is a front elevation of another form of rotor.

Figure 11 is a section on the line 11—11 of Figure 10.

Referring to the drawing in detail, the laminations comprising the magnet field plates of the motor are designated generally 1. These laminations consist of an arcuate portion 2, a relatively small unshaded pole 3 and a relatively large shaded pole 4. One-half of the laminations on one side have the small pole at the top and the large pole at the bottom. The other half of the laminations on the other side have the large pole at the top and the small pole at the bottom.

At the bottom of the laminations are laterally projecting portions 5 extending to and overlapping upon the depending portion 6 of the adjacent laminations. These members 5 bridge the gap 7 between the two sets of laminations, in which gap is mounted the field coil 8, which is connected to a source of electrical energy through the wires 9 and 10 in the usual manner.

The large poles 4 are about two-thirds larger than the smaller poles 3. Thus we are enabled to balance the power in the shaded pole to that of the unshaded pole. The poles 4 have mounted on them the shading coils or plates 11.

It will be noted that the interior faces of the poles are arcuate so as to be brought in close parallel relationship with the periphery of the rotor generally designated 12, the exact construction of which will be hereinafter explained.

The laminations 1 are bolted together by the bolts 13 through the depending portions 6 and the laterally extending portions 5. They are also bolted together by the bolts 14 which project into the sleeves 15 of the gear box casing 16. The gear box 16 is a casing provided with supporting ears 17. The details of this gear box are not important.

Referring to the rotor of Figures 6 and 7, the rotor 12 is mounted on a shaft 18 which extends into the gear box 16 for driving the gears therein. 19 is a pinion on the outside of the gear box driven by the gears in the gear box so actuated by the shaft 18.

The rotor consists of the pair of spaced plates 20 and 21 that are identical with one another. These plates have struck-up ribs 22 arranged opposite to one another so that there are enlarged spaces 23 at predetermined intervals between the plates. Thus this rotor of thin heat-treated carbon steel is so drawn as to bring more metal into the rib areas 22 to form four synchronizing poles in the rotor disks. This assures self-starting.

An alternative form is shown in Figures 8 and 9, in which one or more disks 24 are pressed from annealed carbon steel so that the spoke sections constituting the four poles 25 and the rim 26 are left full thickness, while the intermediate areas 27 are thinner. This construction also gives a self-starting rotor and a self-starting motor. The rotor of Figures 8 and 9, after being so pressed with the identations 27, is hardened.

Referring to Figures 10 and 11, a pair of metal disks are punched with four openings 28. The tongue material so punched to form the openings is turned backwardly and outwardly as at 29 so that an additional mass of material is provided where the tongues engage one another face to face between the respective disks of metal 30. The ends of the tongues just reach the outer rims of the disks.

It will be understood that we desire to comprehend within our invention such modifications as may be necessary to adapt it to varying conditions and uses.

It will be understood that with the four-pole rotor in this sub-synchronous bi-pole construction the speed is 1800 R. P. M. If the rotor is divided into six poles the speed will be 1200 R. P. M. By arranging the rotor in various divisions, various speeds may be secured.

Having thus fully described our invention, what we claim as new and desire to secure by Letters Patent, is:

1. A rotor for a self-starting synchronous motor comprising a metal disk with perforations disposed intermediate the center and periphery thereof, the material from the perforations being turned over at the outer edge of each perforation and directed outwardly parallel to the face of the disk whereby pole areas are formed in the disk periphery of a greater amount of metal than in the central areas thereof.

2. A rotor unit for a self-starting synchronous motor comprising a pair of spaced metal disks having tongues punched therefrom and turned backwardly and outwardly toward the peripheries thereof, the tongues of one disk being bent into adjacent parallel relationship with the tongues of the other disk whereby pole areas are formed in the periphery of said rotor unit with a greater amount of metal than in the central areas thereof.

WILLIAM L. HANSEN.
IRA N. HURST.